Patented Apr. 4, 1944

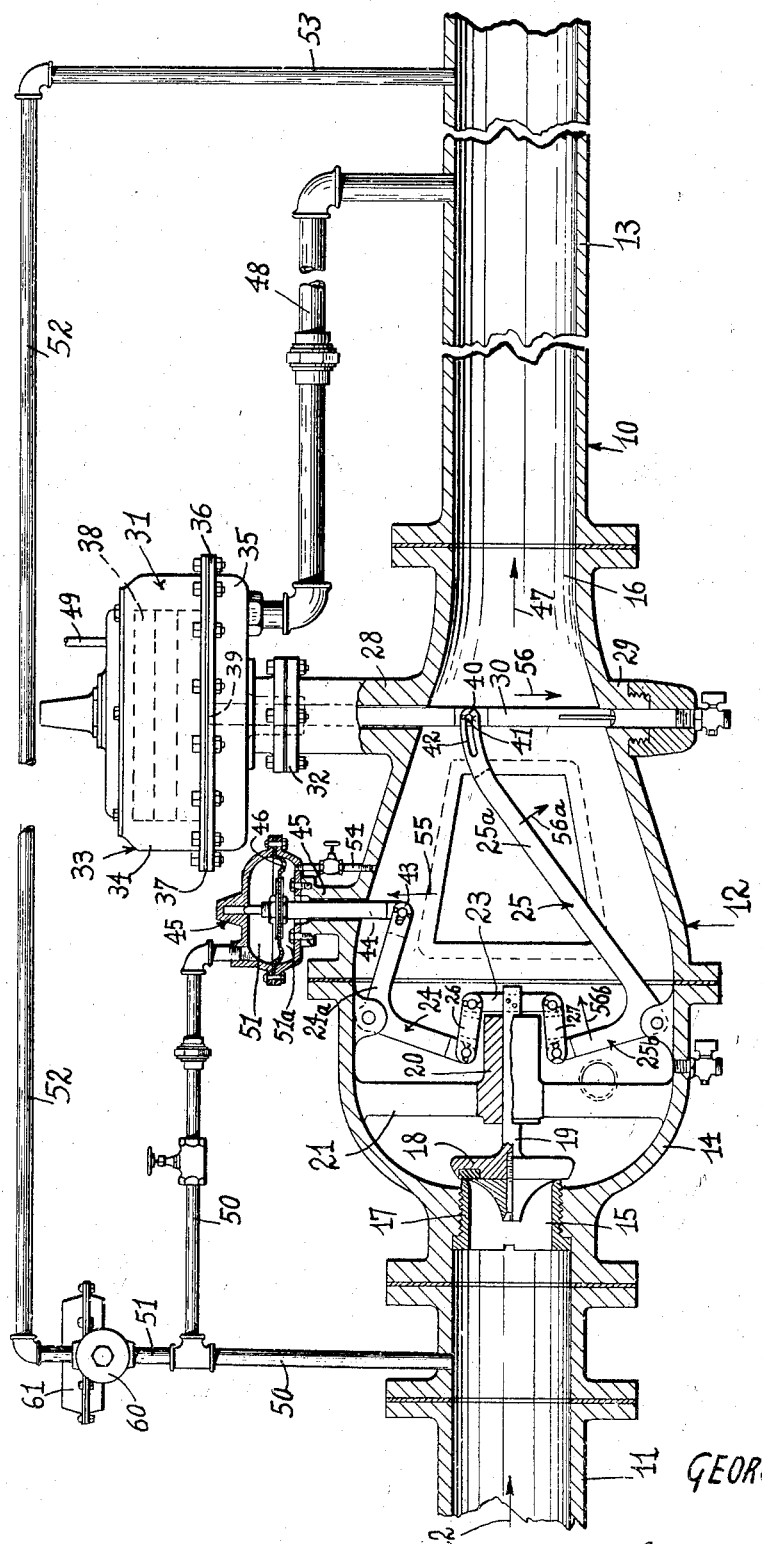

2,345,824

UNITED STATES PATENT OFFICE 2,345,824

SINGLE PORT PRESSURE BALANCED GAS REGULATOR

George T. Macbeth, Bronxville, N. Y.

Application October 22, 1941, Serial No. 416,023

5 Claims. (Cl. 50—16)

This invention relates to regulators for gas pipe lines.

As it is well known in this art, city gas is produced at a comparatively high pressure but used at a very low pressure by the consumer in his apparatus, like stoves, ranges, furnaces, etc. Very strict reliable and careful regulation is needed to control the pressure of the gas as it will reach the consumer and to permit only low pressures, since if high pressure would be allowed, or by accident could reach the mentioned various usual apparatus for gas, great damage and even disaster would result.

Formerly the pressures at which the gas was produced in the main pipe lines to the districts of the consumers were comparatively low, but spread of the population necessitates long main lines and therefore much higher gas pressures for obvious reasons of efficiency, in transmission, and to be able to use comparatively light pipe lines even for long distances.

When gas transmission and regulation was done at lower pressures the so-called double port gas regulator worked satisfactorily, now as it becomes necessary to transmit and regulate gas at high pressures, the double port gas regulator is very unsatisfactory, as will be explained in detail hereinafter.

The main purpose and object of my invention is to provide a regulator adapted to high pressure city gas main lines to supply the gas to the ultimate users at a uniform low pressure.

Another object of my invention is to control and regulate the flow and pressure of the gas to a pre-determined point and at the same time deliver the proper volume or quantity of gas required to fill the demand or load created on the distribution system by the use of gas by consumers.

Such control, the opening and closing of my single port pressure balanced gas regulator valve or port, are all done automatically for the demand, through medium of pressure drops to any determined control point or to pressures desired on the outlet of the regulator.

The pressure balance of a regulator means that the internal working parts are balanced with its internal pressures so as to obtain a smooth and even movement of the valve or port device and avoid creating waves or turbulence of the gas passing.

Another object of my single port regulator, therefore, is to control and regulate the flow of gas through it with the minimum amount of turbulence or fluctuation of the pressure so controlled.

Still a further object of my invention is to secure the most direct flow of gas through the gas regulator and with the least number of direction changes of flow.

A further object also is to reduce to a minimum the loss of pressure through a single port regulator which is a great advantage when it is required to handle gas at very low pressures at the inlet to the regulator.

With the use of the high transmission pressures in order to prevent these high pressures reaching consumers in case of a regulator failure, it has became the custom to install two regulators in tandem. This cannot be done with the two port regulator without further difficulties, as it is well known that they set up a large amount of turbulence, which interferes with their smooth operation.

On account of the low amount of turbulence set up in the gas passing through my device it is easily possible to install two of my single port regulators in tandem, and a further object of my invention is to provide a gas regulator of the type mentioned which will be adapted to work one after the other, in tandem.

The double port regulators now in use for gas mains require great pressure for a tight closing of their valves when there is no load or consumption of gas, on account of their construction. In such regulators, two discs of the double valve are attached to the same control rod. This is required on a double valve or double port regulator, it being the method used by that regulator to insure balanced internal pressure.

My single port pressure regulator obtains a balance of its internal pressures by means of a diaphragm, a method which has never been used before, for this purpose.

Through its construction my device may easily and reliably insure a tight closing of the gas line when the consumption stops, and to provide such a device is still a further object of my invention.

The use of the double port regulator has also been unsatisfactory on account of the turbulence set up in the gas being supplied and expensive means are resorted to smooth out these turbulences after they have been created.

My single port regulator sets up a minimum amount of turbulence, and their minimum amount tends to be smoothed out by the shape of my regulator itself.

Still a further object of my invention, therefore, is to provide a gas main pressure regulator which will set up less disturbance than is the case with the regulators now in use, and wherein there is an automatic tendency for the smoothing out of such minimum disturbance.

One most important object of my invention is to provide a gas regulator of the class indicated, which always will be in perfect balance ready to react to the smallest changes in the low pressure of consumer's end of the gas line. For this purpose I use a diaphragm for balancing the internal pressure and working parts of the regulator. Diaphragms up to now have been used for controlling the regulator flow, but not for the balancing of the working parts of the device. Balancing of the working parts of a regulator is absolutely necessary so that its control may be easily and smoothly actuated.

The automatic pressure and supply of gas from my single port regulator is also controlled by a second diaphragm in the same way as other regulators have been controlled by many years of practice and this feature of my device is not claimed by me as novel except in combination with the other features of my invention.

Still further objects of this invention will be apparent as the specification of the same proceeds, and among others I may mention: to provide a device as characterized hereinbefore, which will be comparatively simple in construction, reliable in operation, safe against the action of water which sometimes floods the pits in which such regulators are housed, and which it will be comparatively inexpensive and easy to manufacture, assemble and install.

The drawing accompanying this specification and forming a part thereof is a semi-diagrammatical sectional elevation of a section of a gas main line into which my novel single port pressure balanced regulator has been installed.

In said drawing, the numeral 10 indicates a gas main line, in general, having a portion 11 before my regulator (generally indicated by the numeral 12) and a portion 13 thereafter.

The portion 11 of the gas main line is under high pressure conducting the high pressure gas from the generating plant to the regulator, and the portion 13 after the regulator is under low pressure conducting the gas to the consumer.

My novel regulator comprises a housing 14 of elliptical contour, having an inlet opening 15 and an outlet opening 16. Into the inlet opening is set a valve seat 17 controlled by the valve disc 18 having the stem 19 slidably mounted in the hub 20.

All these devices, as well as the other parts of my invention, are shown in the single figure of a sectional elevation, since all of them will be well understood from such a showing by those versed in the art being of obvious standard constructions. Hub 20 is secured to the housing 14 by radial arms 21, as is well known, leaving ample space therebetween for the passage of the gas. The high pressure gas flows in the line 11 to the valve 18 as indicated by the arrow 22. A cross member 23 is secured on the inner end of the valve stem 19 and upper and lower rocking angle levers 24 and 25, respectively, are secured at the respective upper and lower ends of the cross member 23 by the pivoted link members 26 and 27.

On the low pressure side of the regulator housing 14 upper and lower projections or lugs 28 and 29 are provided having registering coaxial bores in which a rod 30 is slidably arranged.

A usual diaphragm regulator device 31 is secured on the upper end of the projection 28 in a water and gas tight manner as indicated at 32.

The construction of the diaphragm regulator 31 is well known in this art and it consists of a housing, generally indicated by the numeral 33 having an upper portion 34 and a lower portion 35 secured together in a water and gas tight manner through appropriate flanges, as indicated at 36. A well known resilient regulator or control diaphragm 37 is secured between the two halves of the housing 33 transversely thereacross, as will be understood, and appropriate pre-determined weights 38 may be placed on the diaphragm to exert a downward pressure thereon. The upper end 39 of the slidable rod 30 is secured to the center of the diaphragm 37 as it is usual in this art (not shown).

The outer or free end 40 of the arm 25a of the lower angle lever 25 pivotally and yieldingly engages a pin 41 on the sliding rod 30, said end 40 being forked and each branch or arm of its fork having a slot 42 therein, as indicated in the drawings, and as will be understood by those versed in this art.

The outer free end 43 of the arm or branch 24a of the upper rocking angle lever 24 pivotally and yieldingly engages the lower end of a rod 44 slidable in the bore of a second upward projection or lug 45 on the housing 14, on the upper end of which is secured a second smaller diaphragm regulator or control device 45 of standard well known construction, its diaphragm 46 being secured to the slidable rod 44, as indicated in the drawing.

It will be understood that the high pressure gas, coming as indicated by the arrow 22, will be reduced in pressure after passing my regulator 12, and such low pressure gas will continue to move in the pipe section 13, as indicated by the arrow 47.

From said low pressure pipe 13, a connection 48 is provided to the lower section or space 35 of the weight operated diaphragm regulator 31, and the upper space 34 thereof is connected to the atmosphere, as by the small tube or pipe 49.

From the high pressure gas line 11, a connection 50 is provided to the space 51 above the membrane 46 in the secondary smaller diaphragm regulator 45 and a branch 51 of said small branch 50 of the high pressure gas is continued directly to the low pressure side 13, as indicated at 52 and 53.

The lower space 51a in the secondary small diaphragm regulator 45 is connected with the low pressure side of the valve housing as by the small valve controlled tube 54.

The operation of my single port pressure balanced gas regulator is as follows:

The conditions and dimensions of the valve disc 18 and the diaphragm 46 in the secondary regulator 45 will be chosen in such a manner that the high pressure gas acting on said valve disc through the main line 11 and on said membrane 46 through the pipe pass 50 will make the device entirely counterbalanced, so that the valve 18 will be in an entirely free floating condition.

This result will be understood by examining the drawing and it will be seen that the direct pressure of the gas in the line 11 will act on the left hand side of the valve disc 18 in the direction of its flow, that is, the arrow 22, and will have the tendency to move the valve stem 19 in a similar direction, thereby causing the outer end 43 of the rocking angle lever 24 to move in an upward direction, as indicated by the arrow 55, trying to move the slidable rod 44 and the center of the diaphragm 46 in a similar upward direction. On the other hand, however, the same pressure of the gas in the line 11 will pass through the branch off 50 over and above the membrane 46 and will have a tendency to press the same downwardly counter-acting the upward tendency thereon exerted by the valve 18 through the link mechanism just mentioned.

As has been mentioned, by judicious design the valve 18 will be put into an entirely floating neutral condition under any original high gas pressure.

The weights 38 acting on the membrane 37 will have a tendency to move the rod 30 in a downward direction, as indicated by the arrow 56, thereby moving the outer arm 25a of the rocking lever 25 in the direction of arrow 56a and causing the rocking of the other arm 25b thereon in a right hand direction as indicated by the arrow 56b so that ultimately the slidable stem 19 will be moved in a right hand direction, similarly as is the tendency of the gas pressure on the valve 18, and the valve 18 will start to be opened.

Upon the opening of the valve disc 18, the gas pressure on the right hand side of the device, that is, in the lower pressure side thereof, will start to gradually increase and said increased pressure will act on the main membrane 37, in an opposite direction to the action of the weights 38, that is, upwardly, thereby having a tendency to close the valve disc 18, and after a certain increase in the pressure of the gas in the consumer's line, the valve will remain stationary in said condition.

If the consumption of the gas is increased, thereby reducing the pressure in the lower pressure line 13, the action of the weight 38 will place the disc 18 in a wider open position, as will be understood, thereby providing for the increased consumption of gas and making up for the loss of pressure.

If, on the other hand, the consumption of gas decreases, thereby increasing the pressure in the low pressure line 13, the same will act on the membrane 37 against the weights 38, and will move the membrane with its sliding rod 30 in an upward direction slowly closing the disc 18 until the pressure on the low pressure line 13 drops to the desired amount.

It will be seen, therefore, that my device provides an entirely balanced single port or single disc valve which is governed and controlled by the changes of pressure in the low pressure or consumer's line and never permit the same to rise to any dangerous degree.

In case no load is on the line 13, that is, no consumption of gas, there will be no counter-pressure against the membrane 37 and the weights will entirely, fully and tightly close the disc 18 permitting no gas to pass through my device.

In case, during such a stoppage of the flow of the gas, or if a very small amount of gas is used on the line 13, and by the practical factors of the construction of such devices, the valve 18 would, anyway, fully close, means must be provided that some gas can pass from the high pressure section 11 to the low pressure section 12, around my device, but at a necessarily and safely reduced pressure.

For this purpose the small branch off line 50 of the high pressure gas is continued in the mentioned further extensions 51, 52 and 53 by which a small amount of gas may pass from the high pressure line to the low pressure line even when my device is fully closed, as will be understood. A regulating valve 60, controlled by a diaphragm regulator 61, each of well known construction, generally used today for such reduction of the pressure of gas in the consumer's line, and well known by those versed in this art, is inserted into the by-pass line 51—52, so that the high pressure gas coming from the main line 11 and reaching the devices 60 and 61 with said pressure will be reduced to a safe low consumer's pressure therethrough and will pass with such low pressure into the lines 52 and 53 and therethrough into the low pressure section 13 of the main line.

It also will be seen that all the parts of my valve construction, as well as the regulators and membranes, are sealed in a water and gas tight manner. It is well known that such regulators are and naturally must be installed underground, usually in a pit, and very often water fills the pit and causes great trouble and even serious danger in the present installations by water seeping over the control membranes of the regulators now used and exerting pressure thereon thereby entirely changing the pressure conditions in the gas system. All this is automatically eliminated in the simple construction of my device, as shown in the drawing and described hereinbefore. The atmosphere connection line 49 from the upper section 34 of the main membrane governor or regulator 38 therefore must be conducted to the upper level of the pit so that it should not permit water flowing over the membrane 37 even in case the pit is inundated.

What I claim as new, is:

1. In a reducing valve adapted to be inserted between a high pressure and a low pressure fluid pipe line, having a closure member for the high pressure fluid line, a first resilient membrane regulator exposed to the high pressure on one side and to the low pressure on the other, a first link mechanism between said first membrane and said closure member whereby normally high pressures on said membrane and said member, respectively, normally will counter-act one another and keep said closure member in a balanced floating condition, a second resilient membrane regulator exposed to said low pressure on one side and to an adjustable pressure on the other, a second link mechanism between said closure member and said second membrane, normally having a tendency to open the said closure member by the action of said adjustable pressure of said second membrane, said two resilient membrane regulators, and said two link mechanisms, being in the form of two separate structures, independent of one another, and independently acting on said closure member.

2. In a reducing valve, as set forth in claim 1, a housing for said closure member, both of said link mechanisms being in said housing, said first link mechanism including a first bell crank pivoted in said housing, one end thereof being pivotally connected to said closure member, and the other being pivotally connected to a first slidable member in said housing, said first slidable member being actuated by said first resilient membrane, a second bell crank in said housing for said second link mechanism pivotally connected at one end to said closure member and at the other end to a second slidable member in said housing, said second slidable member being actuated by said second resilient membrane.

3. In a reducing valve, as set forth in claim 1, a housing for said closure member, both of said link mechanisms being in said housing, said first link mechanism including a first bell crank pivoted in said housing, one end thereof being pivotally connected to said closure member, and the other being pivotally connected to a first slidable member in said housing, said first slidable member being actuated by said first resilient membrane, a second bell crank in said housing for said second link mechanism pivotally connected at one end to said closure member and at the other end to a second slidable member in said housing, said second slidable member being actuated by said second resilient membrane, the arm of said second bell crank connected to said second slidable member being substantially longer than its other arm, and said second resilient membrane being considerably larger than said first membrane, whereby said closure member will be quickly influenced in its opening or closing movements by said second membrane reacting to changes in said low pressure.

4. In a reducing valve adapted to be inserted between a high pressure and a low pressure fluid pipe line, having a closure member for the high pressure fluid line, a first resilient membrane regulator exposed to the high pressure on one side and to the low pressure on the other, a first link mechanism between said first membrane and said closure member whereby normally said closure member will be in a balanced floating condition under the influence of said counteracting high pressures on said closure member and said first membrane, respectively; a second resilient membrane regulator exposed to said low pressure on one side and to an adjustable pressure on the other, a second link mechanism between said closure member and said second membrane, normally having a tendency to open the said closure member under the influence of said low pressure, said two resilient membrane regulators, and said two link mechanisms, being in the form of two separate structures, independent of one another, and independently acting on said closure member, a cross piece on said closure member, said link mechanisms being arranged at the two sides of said closure member, and connected to two opposite ends of said cross piece.

5. In a reducing valve, as set forth in claim 1, a housing for said closure member, both of said link mechanisms being in said housing, said first link mechanism including a first ball crank pivoted in said housing, one end thereof being pivotally connected to said closure member, and the other being pivotally connected to a first slidable member in said housing, said first slidable member being actuated by said first resilient membrane, a second bell crank for said second link mechanism pivotally connected at one end to said closure member and at the other end to a second slidable member in said housing, said second slidable member being actuated by said second resilient membrane, a third slidable member in said housing, said closure member being secured on said third slidable member, a cross piece on the end of said third slidable member, said two link mechanisms being arranged at the two sides of said closure member and connected to the two opposite ends of said cross piece.

GEORGE T. MACBETH.